United States Patent [19]
Kim et al.

[11] Patent Number: 5,739,872
[45] Date of Patent: Apr. 14, 1998

[54] HIGH-SPEED MOTION ESTIMATING APPARATUS FOR HIGH-DEFINITION TELEVISION AND METHOD THEREFOR

[75] Inventors: Hyung Suk Kim; Sang Hoon Choi, both of Seoul, Rep. of Korea

[73] Assignee: LG Electronics Inc., Seoul, Rep. of Korea

[21] Appl. No.: 515,593

[22] Filed: Aug. 16, 1995

[30] Foreign Application Priority Data

Aug. 18, 1994 [KR] Rep. of Korea ............... 1994/20383

[51] Int. Cl.$^6$ ............................................. H04N 7/30
[52] U.S. Cl. ............................ 348/699; 348/413
[58] Field of Search ......................... 348/699, 413, 348/416, 420, 401, 402, 409, 412, 411, 415; 382/236, 238

[56] References Cited

U.S. PATENT DOCUMENTS 5,144,429  9/1992  Haghiri et al. ...................... 348/413
5,502,492  3/1996  Jung .................................. 348/413
5,537,155  7/1996  O'Connell et al. .................. 348/699

*Primary Examiner*—Amelia Au
*Attorney, Agent, or Firm*—Fish & Richardson P.C.

[57] ABSTRACT

A high-speed motion estimating apparatus for a high-definition television is disclosed including a sub-screen forming portion for forming and outputting sub-search areas and prediction blocks corresponding to the respective steps from an input reference image and prediction image; a motion estimating portion for obtaining and outputting a minimum average absolute error and motion vector having the minimum average absolute error corresponding to one sub-search area from the sub-screen forming portion in the respective steps; and a minimum average absolute error motion vector detecting portion for obtaining and outputting a final motion vector having the minimum average absolute error and minimum average absolute error in the respective steps, using motion vectors having the minimum average absolute error and minimum average absolute error which are the outputs of the motion estimating portion.

6 Claims, 6 Drawing Sheets

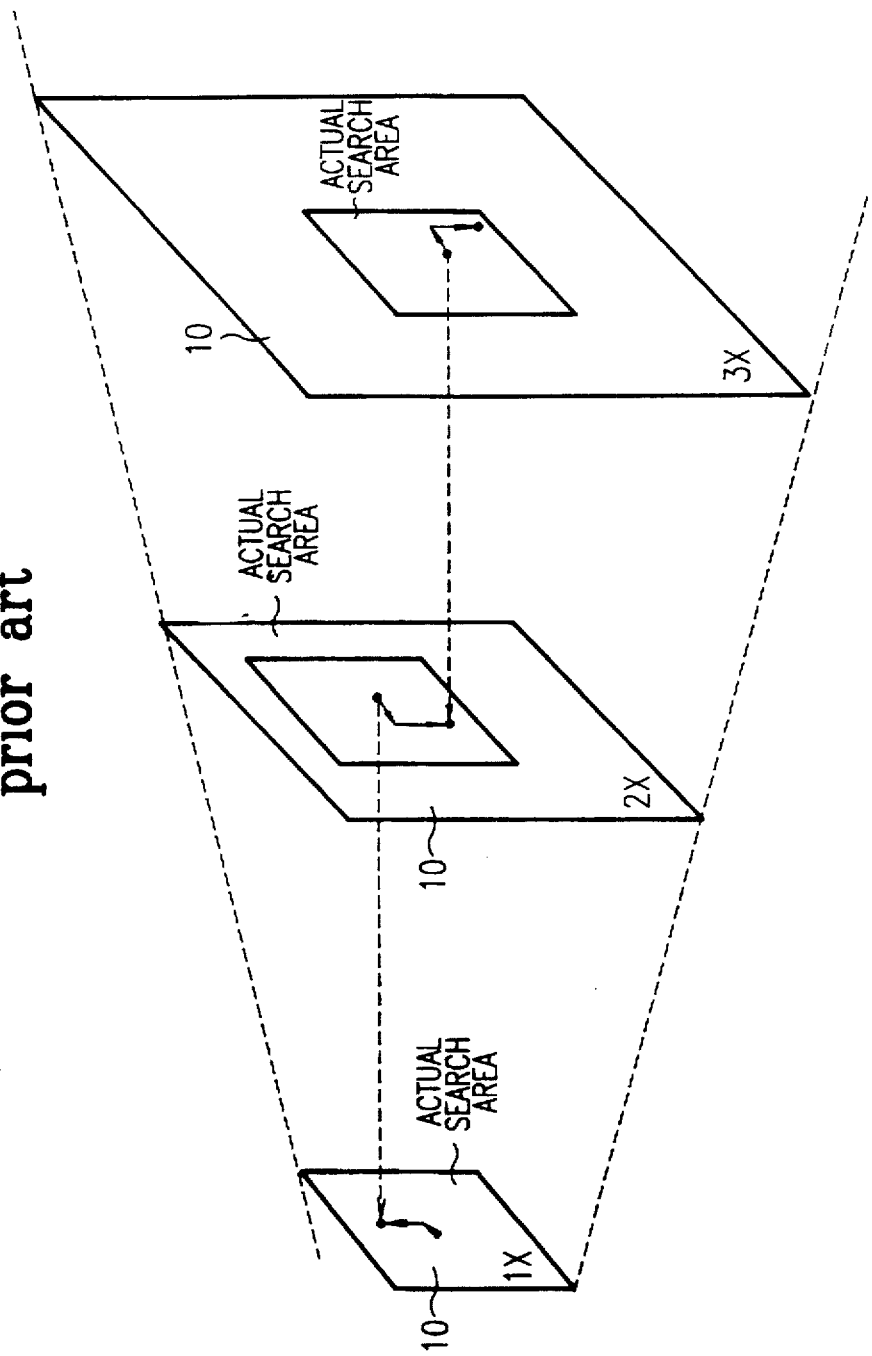

HIGH-SPEED MOTION ESTIMATING APPARATUS FOR HIGH-DEFINITION TELEVISION AND METHOD THEREFOR

FIELD OF THE INVENTION

The present invention relates to a high-speed motion estimating apparatus for a high-definition television and a method therefor, and more particularly, to a high-speed motion estimating apparatus for a high-definition television and a method therefor, which reduces the amount of operation and enhances the precision thereof when a high-speed motion estimating apparatus of a large search area estimates motions.

BACKGROUND OF THE INVENTION

General motion estimating methods include full search, two-dimension logarithmic search and telescopic search, which will be explained with reference to FIGS. 1A, 1B and 1C.

As shown in FIG. 1A, the full search method obtains errors of a search area 10 taken from a reference frame image while shifting a prediction block 20 to be currently predicted in units of pixel. In this method, the relative coordinates X and Y of a minimum error block 30 having the smallest error among the thus obtained errors are taken using a motion vector, the mixed vector of X-coordinate vector 104 and Y-coordinate vector 105. This full search method performs the most precise search among the several motion search methods. However, if the size of search area 10 and the number of prediction blocks 20 are large, a lot of operations must be involved, requiring long time of operation.

The two-dimension logarithmic search method is to reduce the amount of operation, which is the drawback of the full search method. In this method, the amount of operation is reduced into one several tenths or hundredths, and the time required to perform the operation is reduced to several tenths the original time, as compared with the full search method. Referring to FIG. 1B, errors are obtained interspersely between the respective step sizes on search area 10. The procedure goes to a new step while moving to a position having the smallest error among the errors obtained.

In a new step, its step size is reduced according to the following equation, repeating the above-described process.

$d_{n+1} = \log_2 (d_k$ is kth step size)

When the step size reaches one pixel interval, search is finished. A position where the minimum error is present in the final step becomes a motion vector.

Though the two-dimension logarithmic search method reduces the amount of operation, as compared with the full search method, the operation precision decreases as the search area becomes large. The telescopic search method is illustrated in FIG. 1C.

Generally, if the distance difference between a prediction frame and reference frame is present, the search area becomes larger in proportion to the frame distance difference, increasing the amount of operations. As shown in FIG. 1C, the telescopic search method is based on the fact that the motion vector between nearby frames is similar. According to this method, the search area does not increase even when the distance difference between frames is present, and a search is performed while moving only as long as the motion vector found in the previous frame.

The telescopic search is useful when there is a distance difference between frames. However, if the motion vectors between nearby frames are not similar, due to, for instance, the change of scene, coping with the change of scene is not prompt. In addition, the amount of movement is detected inaccurately, sharply decreasing the performance.

Meanwhile, a high-speed motion estimating apparatus using such conventional search methods is disadvantageous because it cannot satisfy both reduce the amount of operations and increase precision. Especially, in the case of high-definition television, the increase in the amount of operations and inaccurate detection of motion due to the expansion of the search area are problems to requiring urgent solution.

SUMMARY OF THE INVENTION

Therefore, it is an object of the present invention to provide a high-speed motion estimating apparatus and method thereof for a high-definition television in which a small sub-search area is formed around a point, a search target, by jumping as long as a predetermined step size, while maintaining a format similar to the two-dimension logarithmic search method on the whole, and the full search is performed over the sub-search area, reducing the amount of operation and obtaining a precision like the full search method.

To accomplish the object of the present invention, there is provided a high-speed motion estimating apparatus for a high-definition television comprising: a sub-screen forming portion for forming and outputting sub-search areas and prediction blocks corresponding to the respective steps from an input reference image and prediction image; a motion estimating portion for obtaining and outputting a minimum average absolute error and motion vector having the minimum average absolute error corresponding to one sub-search area from the sub-screen forming portion in the respective steps; and a minimum average absolute error motion vector detecting portion for obtaining and outputting a final motion vector having the minimum average absolute error and minimum average absolute error in the respective steps, using motion vectors having the minimum average absolute error and minimum average absolute error which are the outputs of the motion estimating portion.

For the object of the present invention, there is provided a high-speed motion estimating method comprising the steps of: (a) setting an initial step size and sub-search area size, and establishing the position of the respective sub-search areas; (b) detecting a minimum average absolute error and a motion vector having the minimum average absolute error in the respective sub-search areas; (c) detecting the minimum average absolute error and the motion vector having the minimum average absolute error among the minimum average absolute errors of the respective sub-search areas in one step; (d) deciding whether the motion vector having the found minimum average absolute error is included or not in the central sub-search area of the current step; (e) going to the next step if the motion vector having the minimum average absolute error is not present in the central sub-search area of the current step, establishing the next step size, setting the position of the respective sub-search area of the next step, controlling the position of the central sub-search area of the next step, and then going to step (b); and (f) outputting the motion vector having the found minimum average absolute error as the final motion vector, if the motion vector having the minimum average absolute error is present in the central sub-search area of the current step as the result of step (d).

BRIEF DESCRIPTION OF THE ATTACHED DRAWINGS

FIGS. 1A, 1B and 1C are diagrams of general motion detecting methods;

DETAILED DESCRIPTION OF THE INVENTION

Hereinafter, preferred embodiments of the present invention will be described with reference to the attached drawings.

The high-speed motion search of the present invention mixes the full search and two-dimension logarithmic search. In this invention, a search is performed interspersely by a predetermined step size, not for the whole search area.

In other words, while the two-dimension logarithmic search performs a search for one point by step size intervals, the high-speed motion search of the present invention forms a small sub-search area 102 around a point, a search target, by jumping as long as a predetermined step size, while maintaining a format similar to the two-dimension logarithmic search method on the whole, and the full search is performed over the sub-search area 102.

Figure 1A:
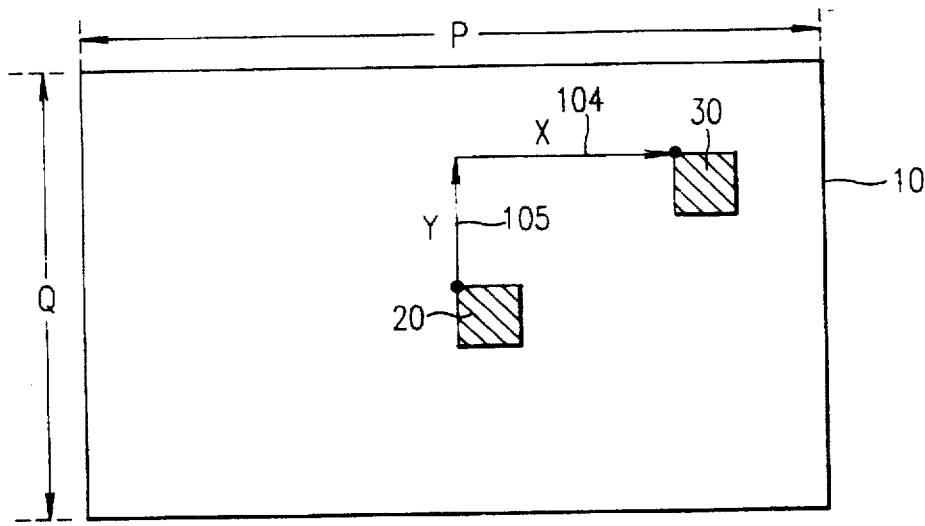
Figure 1B:
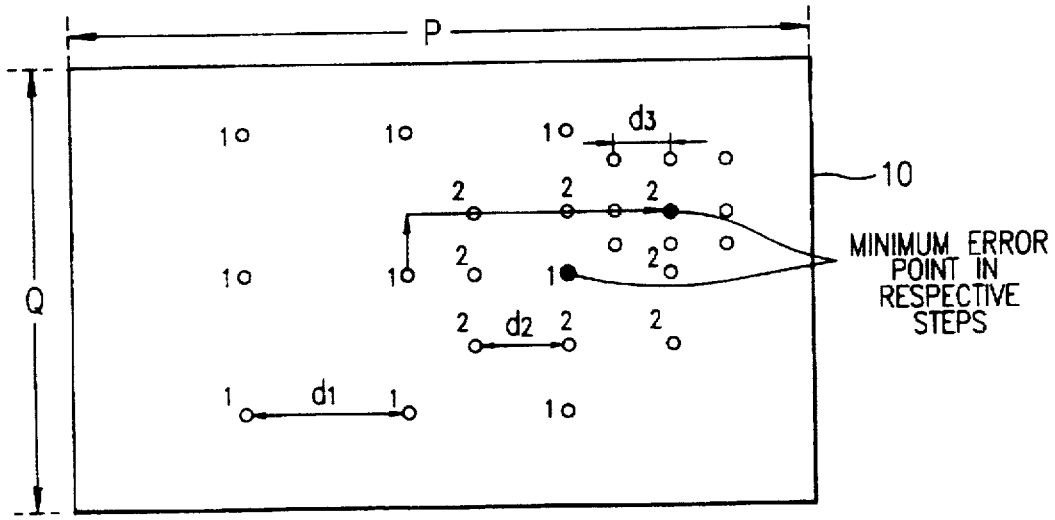
Figure 2:
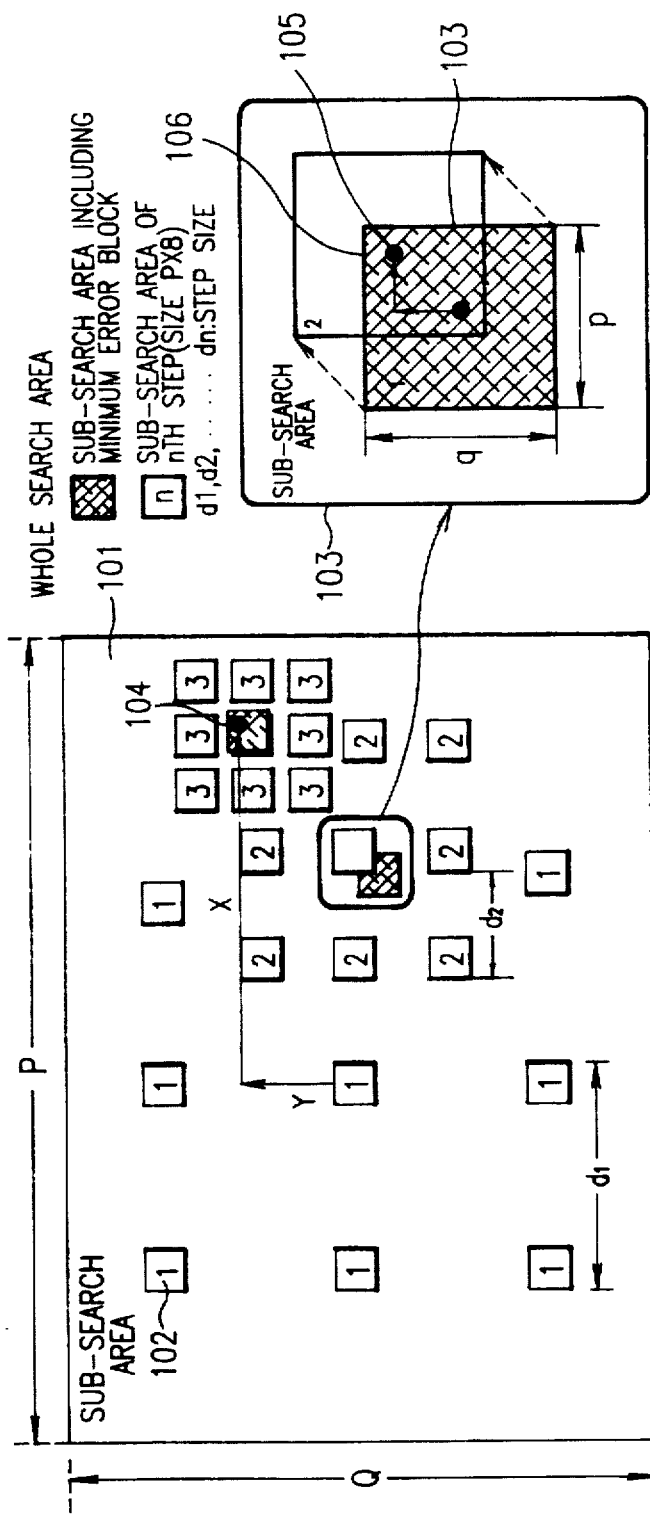
FIG. 2 is a diagram of a high-speed motion detection principle of the present invention.

The high-speed motion estimating apparatus of the present invention will be explained with reference to FIG. 2, which illustrates a process of estimating motions from step 1 to step 3. First, a whole search area 101 is formed from a reference frame image. Sub-search area 102 is formed by intervals corresponding to step size d1 of step 1.

When search is finished over the overall sub-search area, the center of search moves to a motion vector having minimum average error 105 in sub-search area 103 and forms new sub-search area including 106 error, going to step 2. Here, the hatched block is a sub-search area including the minimum error block. The number contained in the block indicates the n-th step sub-search area. Here, the step size is determined as follows.

$d_{n+1} = f(d_n)$, ($d_n$ is nth step size, and $f()$ is an arbitrary reduction function)

Until the fixed minimum error motion vector is included in central sub-search area 104, the above search process is repeated, obtaining a final motion vector.

Figure 3:
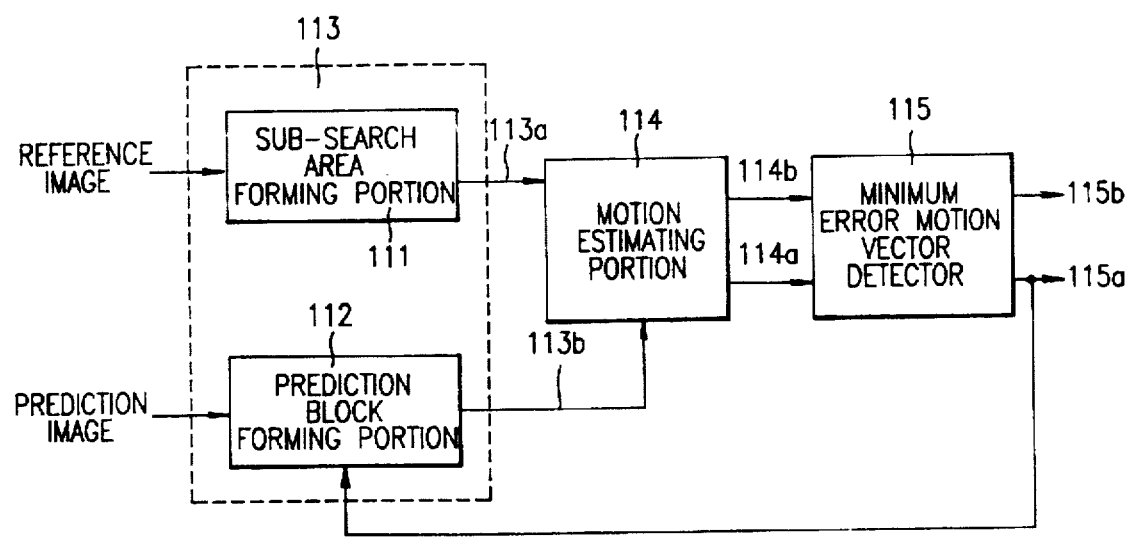
FIG. 3 is a block diagram of one embodiment of a high-speed motion estimating apparatus for high-definition television of the present invention.

Referring to FIG. 3, the high-speed motion estimating apparatus of the present invention comprises a sub-screen forming portion 113 having a sub-search area forming circuit 111 for forming and outputting a sub-search area 113a corresponding to the respective steps from an input reference image, and a prediction block forming circuit 112 for forming and outputting a prediction block 113b from an input prediction image. A motion estimating portion 114 is provided for obtaining and outputting minimum average absolute error 114b and motion vector 114a having a minimum average absolute error corresponding to one sub-search area 113a from the sub-search area and prediction block which are the outputs of sub-search area forming circuit 111 and prediction block forming circuit 112. A minimum average absolute error motion vector detecting portion is provided 115 for obtaining and outputting minimum average absolute error 115b, which is the smallest error in the respective step, and motion vector 115a having the smallest minimum average absolute error, using minimum average absolute error 114b and motion vector 114a, which are output from motion estimating portion 114.

In the high-speed motion estimating apparatus for high-definition television of the present invention, sub-search forming circuit 111 makes a sub-search window 113a corresponding to the respective steps from the input reference image. Prediction block forming circuit 112 makes prediction block 113b from the input prediction image. According to sub-search area 113a and prediction block 113b, motion estimating portion 114 obtains and outputs minimum average absolute error 114b corresponding to one sub-search area 113a. This procedure is repeated until the end of one step.

Minimum average absolute error motion vector detecting portion 115 obtains and outputs minimum average absolute error 115b, which is the smallest error in the respective step, and motion vector 115a having the smallest minimum average absolute error, from minimum average absolute error 114b and minimum average absolute error motion vector 114a, which are output from motion estimating portion 114. After one step, the final motion vector 115a having the smallest minimum average absolute error is fed back to sub-screen forming portion 113, to be thereby used as the initialization material of the next step.

The high-speed motion estimating apparatus for high-definition television of FIG. 3 is favorable if the size P×Q of the whole search area is greater than the size p×q of the sub-search area.

Figure 4:
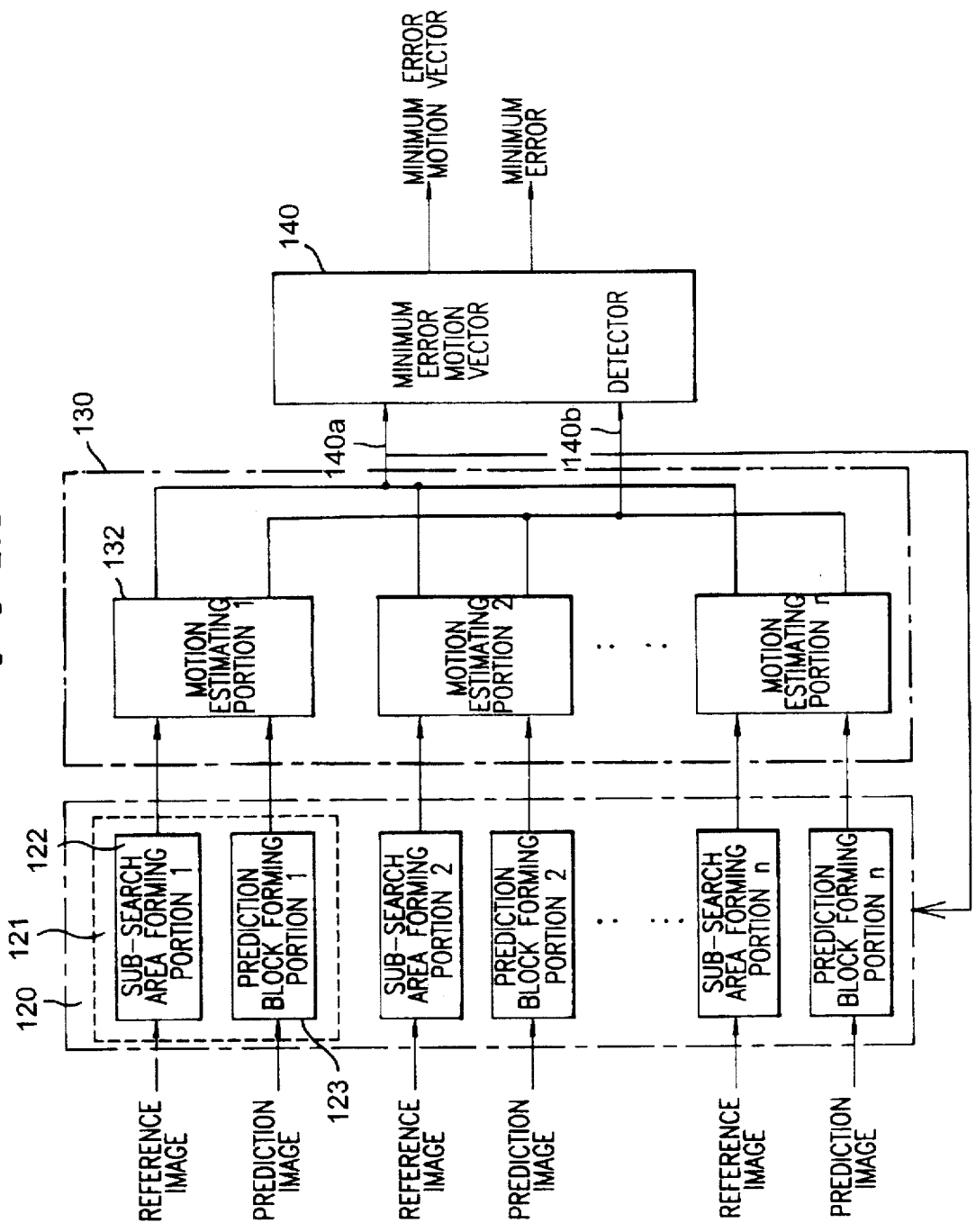
FIG. 4 is a block diagram of another embodiment of a high-speed motion estimating apparatus for high-definition television of the present invention.

FIG. 4 illustrates another embodiment of the high-speed motion estimating apparatus for high-definition television, which is expanded in a parallel structure so as to enable high-speed motion estimation simultaneously in n sub-search areas within one cycle.

Referring to FIG. 4, this embodiment of the present invention comprises a motion error controller 120, motion error processing portion 130, and minimum average absolute error motion vector detecting portion 140.

Motion error controller 120 has n sub-screen forming portions 121. Motion error processing portion 130 has r motion estimating portions 132.

Motion error controller 120 forms sub-search areas and prediction blocks corresponding to the respective steps from the input reference images and prediction images.

Motion error processing portion 130 obtains motion vectors having the minimum average absolute errors and minimum average absolute errors corresponding to n sub-search areas in the respective steps from the output of motion error controller 120, so as to output a motion vector having the minimum average absolute error and minimum average absolute error.

Minimum average absolute error motion vector detecting portion 140 obtains and outputs a final motion vector having the minimum average absolute error and minimum average absolute error in the respective steps, using motion vectors having the minimum average absolute error and minimum average absolute errors which are the outputs of motion error processing portion 130.

After each step, the final motion vector 140a is fed back to motion error controller 120 to construct the sub-blocks for next step.

Similar to sub-screen forming portion 113 of FIG. 3, sub-screen forming portion 121 of FIG. 4 comprises a sub-search area forming circuit 122 for forming and outputting the sub-search areas corresponding to the respective steps from the input reference image, and a prediction block forming circuit 123 for forming and outputting prediction blocks corresponding to the respective steps from the input prediction image.

As described above, the operation of the high-speed motion estimating apparatus of FIG. 4 is similar to that of FIG. 3. The high-speed motion estimating apparatus of FIG. 4 is very useful in high-speed performance of the high-speed estimating apparatus because, in case of motion estimation shown in FIG. 2, one step can be processed for one cycle in the parallel structure of n=9.

Figure 5:
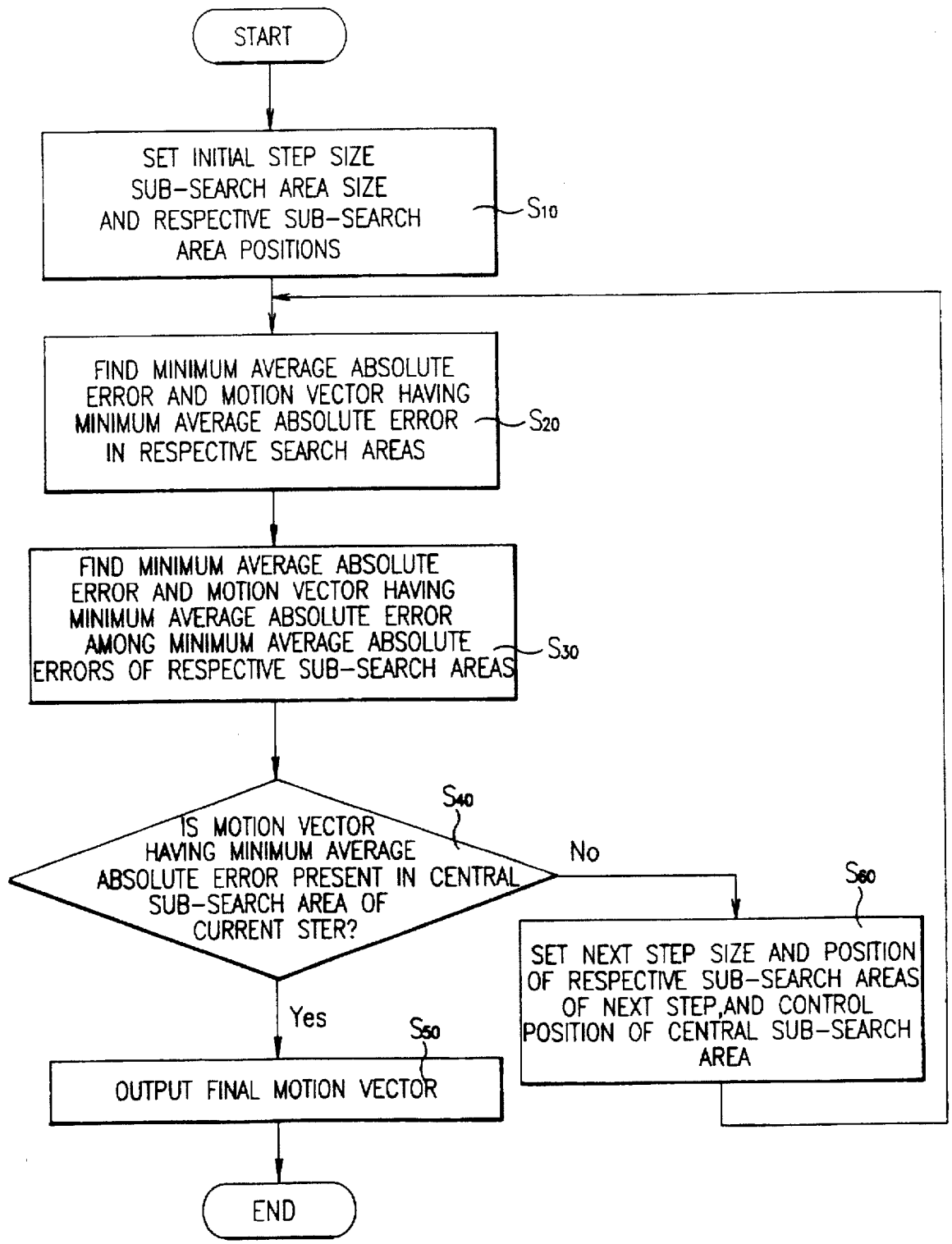
FIG. 5 is a flowchart of the high-speed motion detecting method for high-definition television of the present invention.

Referring to FIG. 5, in step S10, the initial step size $d_1$ and sub-search area size p,q are set, and initialization is performed to establish the position of the respective sub-search areas. In step S20, the minimum average absolute errors and the motion vector having the minimum average absolute error are found in the respective sub-search areas.

In step S30, the minimum average absolute error and the motion vector having the minimum average absolute error are found among the minimum average absolute errors of the respective sub-search areas in one step.

Then, in step S40, it is decided whether the motion vector having the minimum average absolute error is included or not in the central sub-search area of the current step.

In step S40, if the motion vector having the minimum average absolute error is present in the central sub-search area of the current step, the motion vector having the minimum average absolute error is output as the final motion vector in step S50. If not, the procedure goes to the next step, and the next step size $d_{n+1}$ is established. In step S60, the position of the respective sub-search area of the next step is set and the position of the central sub-search area of the next step is adjusted and other sub-search area is formed. Then, the procedure goes to step S20, repeating steps S20, S30, S40 and S60 until the motion vector having the minimum average absolute error is present in the central sub-search area of the current step.

As described above, employing precision of the full search method and reduction of operation amount of the two-dimension logarithmic search method, the present invention improves precision of search and reduces the operation amount. In addition, the present invention can be utilized for real-time system of high-definition TV encoder, MPEG1, and two-moving image encoder.

What is claimed is:

1. A high-speed motion estimating apparatus for a high-definition television comprising:
   a sub-screen forming portion for forming and outputting sub-search areas corresponding to predetermined step sizes from an input reference image and prediction blocks from an input prediction image;
   a motion estimating portion for comparing the sub-search areas to the prediction blocks for obtaining and outputting a minimum average absolute error and a corresponding motion vector for each compared sub-search area; and
   a minimum average absolute error motion vector detecting portion for obtaining and outputting a final minimum average absolute error and a corresponding final motion vector, the minimum average absolute error motion vector detecting portion being configured to:
   (a) detect an overall minimum average absolute error and a corresponding motion vector from among the minimum average absolute errors of a set of sub-search areas;
   (b) decide whether the motion vector corresponding to the overall minimum average absolute error is included in a central sub-search area of the set;
   (c) upon deciding that the motion vector corresponding to the overall minimum average absolute error is not included in the central sub-search area of the set, set a next step size, establish positions of a next set of sub-search areas, set the position of a central sub-search area of the next set so that the central sub-search area includes the motion vector corresponding to the overall minimum average absolute error, and repeat steps (a) and (b); and
   (d) upon deciding that the motion vector corresponding to the overall minimum average absolute error is included in the central sub-search area of the set, output the motion vector as the final motion vector.

2. The high-speed motion estimating apparatus for a high-definition television as claimed in claim 1, wherein said sub-screen forming portion comprises:
   a sub-search area forming circuit for forming and outputting a sub-search area from the input reference image, the sub-search area corresponding to a predetermined step size; and
   a prediction block forming circuit for forming and outputting a prediction block from the input prediction image.

3. A high-speed motion estimating apparatus for a high-definition television comprising:
   a motion error controller for forming and outputting sub-search areas from input reference images corresponding to predetermined step sizes and prediction blocks from input prediction images;
   a motion error processing portion for comparing the sub-search areas to the prediction blocks for obtaining minimum average absolute errors and corresponding motion vectors for one or more sub-search areas from the output of said motion error controller, wherein the motion error processing portion outputs a minimum average absolute error and a corresponding motion vector; and
   a minimum average absolute error motion vector detecting portion for obtaining and outputting a final minimum average absolute error and a corresponding final motion vector, the minimum average absolute error motion vector detecting portion being configured to:
   (a) detect an overall minimum average absolute error and a corresponding motion vector from among the minimum average absolute errors of a set of sub-search areas;
   (b) decide whether the motion vector corresponding to the overall minimum average absolute error is included in a central sub-search area of the set;
   (c) upon deciding that the motion vector corresponding to the overall minimum average absolute error is not included in the central sub-search area of the set, set a next step size, establish positions of a next set of sub-search areas, set the position of a central sub-search area of the next set so that the central sub-search area includes the motion vector corresponding to the overall minimum average absolute error, and repeat steps (a) and (b); and
   (d) upon deciding that the motion vector corresponding to the overall minimum average absolute error is included in the central sub-search area of the set, output the motion vector as the final motion vector.

4. The high-speed motion estimating apparatus for a high-definition television as claimed in claim 3, wherein said motion error controller comprises two or more motion estimating circuits configured in parallel for obtaining and outputting the minimum average absolute errors and the corresponding motion vectors for two or more sub-search areas from the sub-search areas and the prediction blocks that are outputs of two or more sub-screen forming circuits.

5. The high-speed motion estimating apparatus for a high-definition television as claimed in claim 4, wherein said one or more sub-screen forming portions comprise:

one or more sub-search area forming circuits for forming and outputting the sub-search areas from the input reference image corresponding to the predetermined step sizes; and one or more prediction block forming circuits for forming and outputting the prediction blocks from the input prediction image corresponding to the predetermined step sizes.

6. A high-speed motion estimating method comprising the steps of:

(a) setting an initial step size and a sub-search area size, and establishing positions of a set of sub-search areas;

(b) detecting a minimum average absolute error and a corresponding motion vector in each sub-search area;

(c) detecting an overall minimum average absolute error and a corresponding motion vector from among the minimum average absolute errors of the set of sub-search areas;

(d) deciding whether the motion vector corresponding to the overall minimum average absolute error is included in a central sub-search area of the set;

(e) upon deciding that the motion vector corresponding to the overall minimum average absolute error is not present in the central sub-search area of the set, setting a next step size, establishing positions of a next set of sub-search areas, setting the position of a central sub-search area of the next set so that the central sub-search area includes the motion vector corresponding to the overall minimum average absolute error, and repeating steps (b)–(d); and (f) upon deciding that the motion vector corresponding to the overall minimum average absolute error is present in the central sub-search area of the set as a result of step (d), outputting the motion vector as a final motion vector.

* * * * *